UNITED STATES PATENT OFFICE.

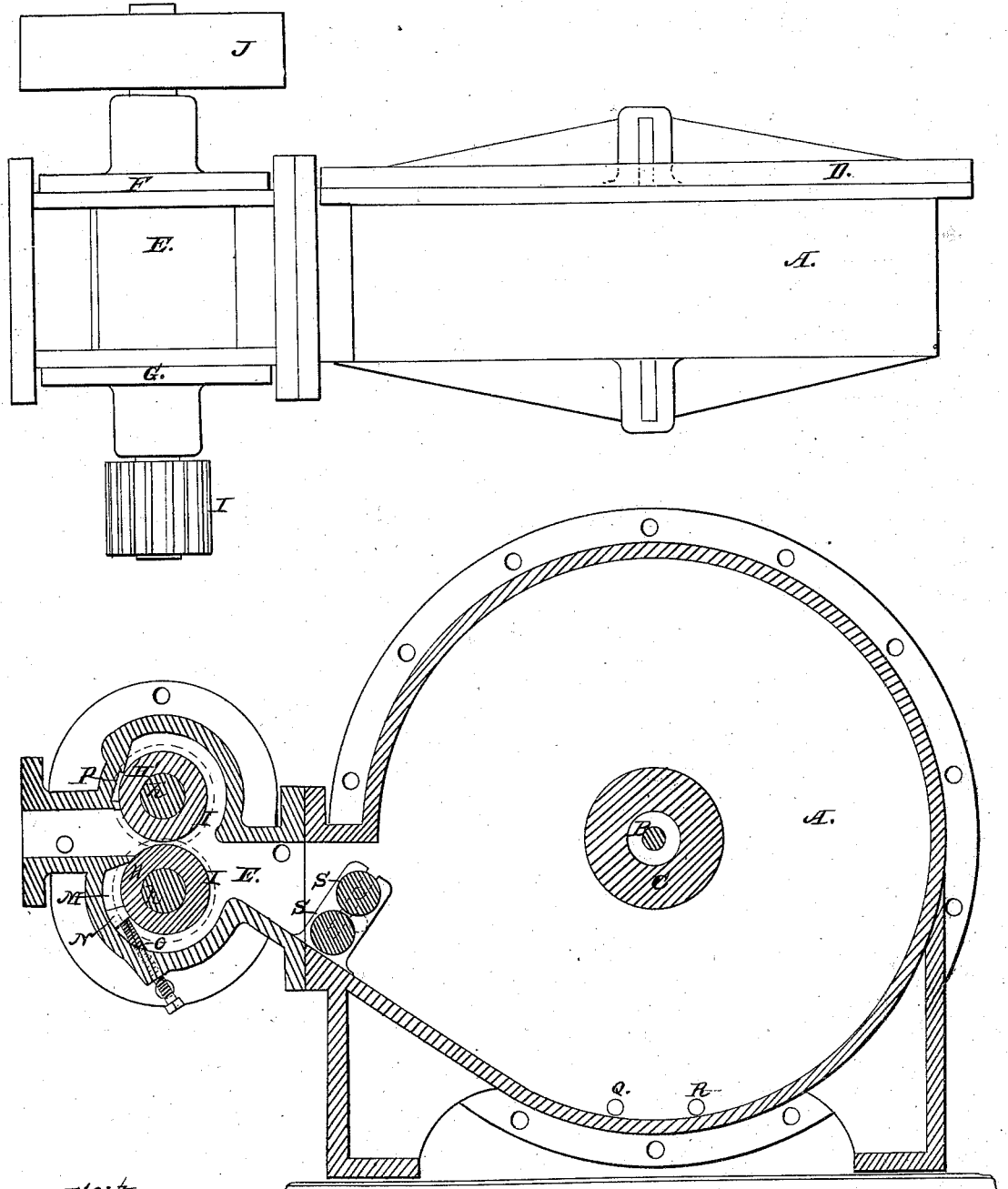

JIM B. FULLER, OF CLAREMONT, NEW HAMPSHIRE, ASSIGNOR TO HIMSELF AND JAMES P. UPHAM, OF SAME PLACE.

IMPROVEMENT IN SEPARATING THE FIBERS OF HEMP, FLAX, &c.

Specification forming part of Letters Patent No. 43,073, dated June 7, 1864.

*To all whom it may concern:*

Be it known that I, JIM B. FULLER, of Claremont, county of Sullivan, and State of New Hampshire, have invented a new and useful method of separating the fibers of hemp, flax, and other similar plants from the gummy, glutinous, and coloring matter by which they are surrounded and held together; and I do hereby declare the following to be a full, clear, and exact description of the same, reference being had to the accompanying drawings, making part of this specification, in which—

Figure 1 is a plan view, and Fig. is 2 a vertical section, of an apparatus in and by which my process is performed.

Similar letters of reference indicate corresponding parts in both figures.

This invention is based on the well-known fact that when flax, hemp, and other similar plants are boiled with water in a close vessel under high temperature and pressure the resinous gums are softened, the albuminous portions are coagulated, and the coloring-matter is dissolved.

The nature of my invention consists in effecting the separation of the fibers of hemp, flax, and other similar plants from the gummy, glutinous, and coloring matter contained in such plants by heating with water or other liquid and pressing between rollers the fibrous material while it is in the form of a sheet, sliver, roving, or similar condition, in which it can be drawn between rollers in the softened heated state.

An apparatus in and by which my invention is performed may be of various constructions; but I consider the one herein described the best adapted to the purpose.

A is a cylinder of suitable size, bolted to the bed-plate *a*. One end is faced to receive a cover or head, the head being cast on the other end.

B is a stud or shaft made fast in the center of the solid head of the cylinder A, running through the center of the cylinder parallel to its axis.

C is a spool or cylinder around which is coiled the fibrous material, as hereinafter described. The spool or cylinder C has a hole through its center parallel to its axis and of a size to fit the stud B, on which it is placed.

E is a case which is secured to one side of cylinder A, and communicating with its interior. F and G are heads bolted to each end of E.

H and H' are two rollers in the case E, and revolving on the shafts *h* and *h'*. These rollers should be so packed at each end as to prevent the escape of steam in that direction.

I I are two spur-gears by which the rollers H and H' are geared together. J is a pulley on shaft *h*.

M is a packing or stuffing box, which should be filled with hemp or other suitable substance which will prevent the escape of steam around the face of the roller H. N is a follower, and O is a screw or screws by which the packing in the stuffing-box M is tightened.

P is a bearing of composition, against which the roller H' works. The apertures in the heads F and G, through which the shaft *h'* passes, are made large, so as to allow the roller H' to rise to admit the fibrous material.

S S are two rollers placed inside the cylinder A or in the space between said cylinder and the rollers H H'.

The operation of the apparatus thus far described is as follows: The hemp, flax, or other material to be treated is first separated from the shive or woody portion by any known method, and is either passed through a drawing-frame, which delivers it in the form of a sliver or roving, or it is passed through a lapper, which delivers it in the form of a sheet. The sheet, sliver, or roving is then coiled on the spool or cylinder C, the coil being nearly large enough to fill the cylinder A. The outer end of the sliver or sheet is passed between the rollers S S and H H', the spool or cylinder C being at this time on the shaft B. The cylinder-cover D is then bolted on and water is admitted from a pipe through the aperture Q, nearly filling the cylinder A. Steam from a boiler is then admitted through the aperture R, raising the temperature and pressure to the point or degree necessary to soften the gummy and resinous portions of the material under treatment. Rotary motion is then given to the pulley J by means of a belt, which causes the rollers H H' to revolve in such a manner as to draw the fibrous sheet or roving out of the apparatus. As the sheet passes out of the apparatus the rollers S S press out a portion of the softened matter and the rollers H H' draw the sheet out, producing a powerful steady pressure on the sheet or sliver, insuring an even quantity of the material delivered, and at the same time pressing back into the cylinder all or nearly all the softened gums, together with the coagulated and coloring matter, thus extracting from the fibers the substances which surrounded and held them together, the fibers retaining their original position relative to each other and adhering together only by aid of moisture. The steam presses on the roller H' in such a manner as to force it toward the roller H, causing a pressure of the rollers H H' against the fiber.

It is important that a powerful but steady pressure should be produced by the rollers on the fibrous material; but such pressure should not be so great as to crush the fibers.

The rollers may be lightly fluted, but not to the extent to produce any grinding, rubbing, heating, whipping, or picking apart of the fibers, as any such operation at this stage of the process would greatly injure, if not destroy, the fibers for textile purposes.

After passing the rollers H H', as above stated, the fibrous sheet, sliver, or roving should be dried in motion by passing between fluted rollers over steam-pipes, or in some other similar manner which will prevent the ultimate fibers from drying together in a hard mass. The fibrous material can then be passed through an ordinary picker, beater, lapper, cards, &c., used for working cotton or other short staple fibers.

I do not claim, broadly, boiling fibrous materials in a close vessel under pressure; neither do I claim, broadly, pressing out the gummy matter by rollers, as this is done under my patent of March 1, 1864.

What I claim as my invention, and desire to secure by Letters Patent, is—

1. Effecting the separation of the fibers of hemp, flax, and other similar plants by first subjecting them, while in the form of a sheet, sliver, roving, or other similar condition, and while in a close vessel, with steam, water, or other liquid at high temperature and pressure, to the pressing action of rollers so placed in such vessel that the said sheet, sliver, or roving shall be drawn between them as they rotate, substantially as and for the purposes specified.

2. Drawing the sheet, sliver, or roving out of the apparatus by and between rollers which press back into the apparatus all or nearly all the resinous, gummy, coagulated, and coloring matter while it is yet in a heated and softened state, substantially as and for the purposes specified.

Claremont, March 14, 1864.

JIM B. FULLER.

Witnesses:
C. S. PARKHURST,
G. WM. HOLDEN.